United States Patent [19]

McMillan, Jr.

[11] 3,722,506

[45] Mar. 27, 1973

[54] ROLLING SEAL SPIROMETER
[75] Inventor: Robert D. McMillan, Jr., Houston, Tex.
[73] Assignee: Airco Inc., New York, N.Y.
[22] Filed: Oct. 15, 1970
[21] Appl. No.: 81,127

Related U.S. Application Data

[63] Continuation-in-part of Ser. No. 838,725, June 16, 1969, abandoned, which is a continuation-in-part of Ser. No. 646,529, , abandoned.

[52] U.S. Cl. ................ 128/2.08, 92/98 RD, 92/103
[51] Int. Cl. ............................................ A61b 5/00
[58] Field of Search ....... 92/98, 98 RD, 103, 103 SM, 92/47; 128/2.08, DIG. 21

[56] References Cited

UNITED STATES PATENTS

| 2,178,953 | 10/1937 | Chilton | 92/98 D |
|---|---|---|---|
| 691,190 | 1/1902 | Sharp | 92/98 D |
| 1,508,654 | 9/1924 | Hales | 92/98 D |
| 2,846,983 | 8/1958 | Otto | 92/98 D |
| 2,860,017 | 11/1958 | Honegger | 92/98 D |
| 3,241,379 | 3/1966 | Rietdijk et al. | 92/98 D |

FOREIGN PATENTS OR APPLICATIONS

| 1,028,644 | 5/1953 | France | 92/98 R |

OTHER PUBLICATIONS

Gold, "The Bulletin," Jan. 1968, page 3.

Primary Examiner—Martin P. Schwadron
Assistant Examiner—Leslie J. Payne
Attorney—Edmund W. Bopp, H. Hume Mathews and Roger M. Rathbun

[57] ABSTRACT

A spirometer for measuring the tidal volume and/or expiratory breathing rate of human lungs including a movable piston positioned within a chamber; the piston being responsive to an expired breath which enters one end of the chamber. A unique U-shaped rolling seal is provided having extremely minute friction losses during movement and which effectively seals the area between the external perimeter of the piston and the internal surface of the chamber.

2 Claims, 4 Drawing Figures

Robert D. McMillan, Jr.
INVENTOR.

BY Hayden & Pravel
ATTORNEYS

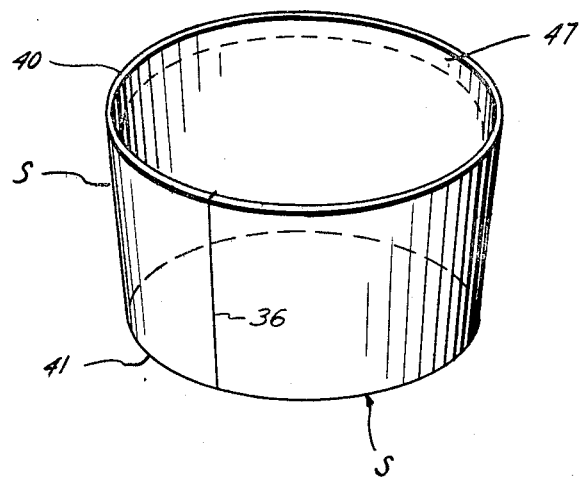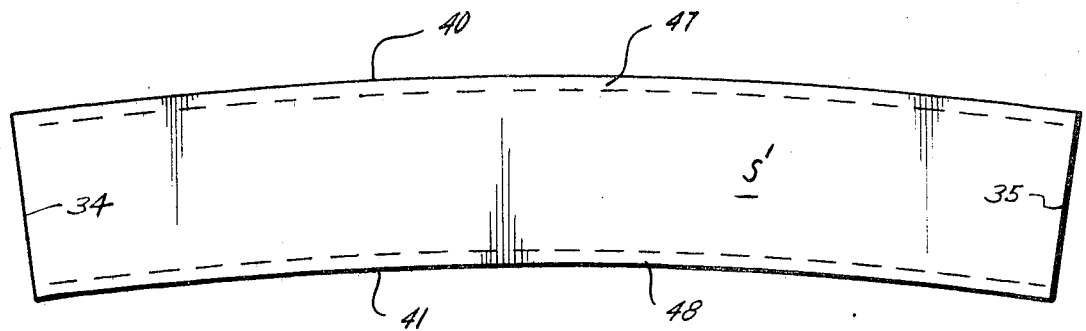

ROLLING SEAL SPIROMETER

BACKGROUND OF THE INVENTION

This application is a Continuation-in-Part of pending application U.S. Ser. No. 838,725, filed June 16, 1969, now abandoned, which was a Continuation-in-part of U.S. Ser. No. 646, 529, now abandoned.

This invention relates to instruments for measuring the breathing rate and/or volume of human lungs, and more particularly to a spirometer having a unique rolling seal providing increased accuracy and precision of operation.

There are two general types of spirometer presently in use, open-circuit spirometers and closed-circuit spirometers. The open-circuit spirometer is characterized by a means to detect the desired pulmonary functions without containing the patient's expired air, and such instruments typically utilize a single or a plurality of Pitot-tube type detection devices. The devices, however, normally require relatively expensive electronic circuitry to obtain a readable function from the detected breathing qualities, and particularly in maintaining linearity of the instruments.

The closed-circuit type spirometer of which the present invention is an example, normally includes a means to contain the patient's exhaled breath and thereby measure the vital functions by some mechanical means associated with an expandable or otherwise movable container.

In the closed-circuit spirometers, a unique problem arises in insuring a sufficiently protective seal between relative moving components or bellows, yet which does not introduce sufficient friction loss into the overall system to affect the accuracy of the measurements. In particular, there are presently available, various closed-circuit spirometers. One such type of spirometer is the water seal spirometer which comprises essentially a pair of cylindrical containers of dissimilar diameters, each having one end open. The smaller can is inverted and fitted into the larger can which is filled with a predetermined amount of water. In this manner, a containable volume is enclosed within the upper portion of the smaller can which may receive the patient's exhaled breath, causing the smaller can to rise proportionally to the tidal volume of the lungs. The water seal affords relatively low resistance; however, there is an inherent inaccuracy introduced through a manometer effect created by a discernible difference in water level between the interior of the inverted can and the level of the water surrounding the exterior of the inverted can. In addition, since the tidal volume measurement is normally taken from the upward distance travelled by the inverted can, any bouncing or other extraneous movement of the inverted can will create inaccuracy in the readings.

In addition, the accuracy of a water seal spirometer suffers from a "lag time" in that the moving cylinder or container will not commence its travel until the volume contained at rest is filled sufficiently to exert a moving pressure on the cylinder, therefore, the first portion of the patient's expired breath first fills the dead volume and is not a measured quantity until the pressure is raised to a point that initial drag is overcome and the measured cylinder moves.

A further known type of closed-circuit spirometer utilizes a bellows, in various fashions, which is expanded by the exhaled breath. A typical example is the wedge spirometer, which takes the form of an old-fashioned hand bellows. In the wedge spirometer, a wedge shaped bellows having one edge fixed, is expanded by exhaled breath. Readings of tidal volume are taken directly by measuring the movement of the non-fixed edge of the expanded bellows. The use of a bellows, however, has inaccuracies introduced through a "ballooning" effect of the bellows, that is, a portion of the bellows may expand laterally during reception of the expired breath and the reading will not accurately portray the entire bellows content.

Thirdly, a further type of closed-circuit spirometer includes a piston movable within a closed-ended cylinder with an S-shaped elastic seal closing the periphery of the piston with the interior of the cylinder. An S-seal however, is incapable of extended travel of the relatively moving components and, therefore, since the piston travel is seriously limited, any measuring devices responding to the piston travel must be extremely sensitive. The resolution of closed circuit spirometers is highly important in achieving accuracy and it is important to achieve a relatively high increment of travel in the instrument for a given change in volume received, that is, for a specific volume of exhaled breath, greater resolution is attained through a maximum movement of the measured parameter. In the S-seal spirometer, since the length of piston travel is limited to a relatively short distance by the seal itself, the overall accuracy is correspondingly impaired.

The relatively short length of piston travel further requires a large diameter piston in order to accommodate the volume needed for measuring lung tidal capacity, and thereby also creates an exceptionally large peripheral dead air space surrounding the piston. As explained, the dead air space prevents instantaneous movement of the piston in response to exhaled breath and instead a lag time occurs during the build-up of pressure in the dead air space.

The S-seal is conducive to "blow-out", i.e. upon experiencing a positive or negative pressure of sufficient magnitude without a corresponding movement of the piston, the seal itself may reverse the direction of one or more of its convolutions. The problem may occur at the end of a piston stroke where additional pressure is exerted by the patient, a seal convolution may thereby snap to relieve the excess pressure and may require a complete disassembly of the spirometer in order to re-orient the seal convolutions. In the S-seal, there is one convolution in each lateral direction, therefore, the seal may blow-out by a positive pressure when the piston is at its farthest forward travel or by a negative pressure when the piston is in its initial position at rest.

SUMMARY OF THE INVENTION

In accordance with the present invention, there is provided an improved spirometer having the capability of providing extremely accurate readings of various pulmonary functions. The spirometer is of the closed-circuit type and utilizes a movable piston fitted within a closed end cylinder. The patient's expired breath is introduced into the closed end of the cylinder and causes the piston to move a distance in proportion to the patient's tidal volume and at the rate determined by the effort exerted by the patient. The closed end, at rest volume, is minimal to insure prompt initiation of movement of the piston as soon as the patient's breath is introduced to the cylinder. A unique seal is provided between the outer perimeter of the movable piston and the interior of the cylinder in order to prevent any leakage therebetween. The seal is characterized by low friction or hysteresis during movement, and has substantially no memory, yet it has sufficient pneumatic stiffness to resist stretching or expanding throughout the expected pressure range. Also, the problem of seal blow-out is virtually eliminated.

In addition, the rolling U-seal allows a substantial length of travel of the piston to insure accurate measurements therefrom and prevents bouncing or other adverse effects from external environment.

The rolling seal is further characterized by a non-molded construction. Similar U-shaped seals have been generally utilized in various mechanical applications; however, such seals are normally of molded composition, suitable for relatively high pressure uses. The molded seals are unsuitable for spirometers where the inherent internal stresses and irregular thickness of molded seals introduces unacceptable inaccuracies into the spirometer. In particular, spirometers necessitate the absolute minimum resistance to breathing. As an example, a spirometer constructed in accordance with the present invention is capable of detecting and discriminating a volume of 1 milliliter and has a resistance to breathing of less than 0.2 centimeter water pressure at normal breathing levels. The dead air space at the inlet port is less than 150 milliliters with an overall operating volume of about 10 liters. Therefore, the present seal is formed of non-molded composition and is accurately controlled as to thickness and free from any reinforcing fibers or material which might increase the hysteresis or friction.

BRIEF DESCRIPTION OF THE DRAWINGS

FIG. 3 shows a truncated one configuration of the unique rolling seal of the present invention; and FIG. 4 is a developed projection of the rolling seal from which the truncated cone is formed.

DESCRIPTION OF THE PREFERRED EMBODIMENT

Figure 1:
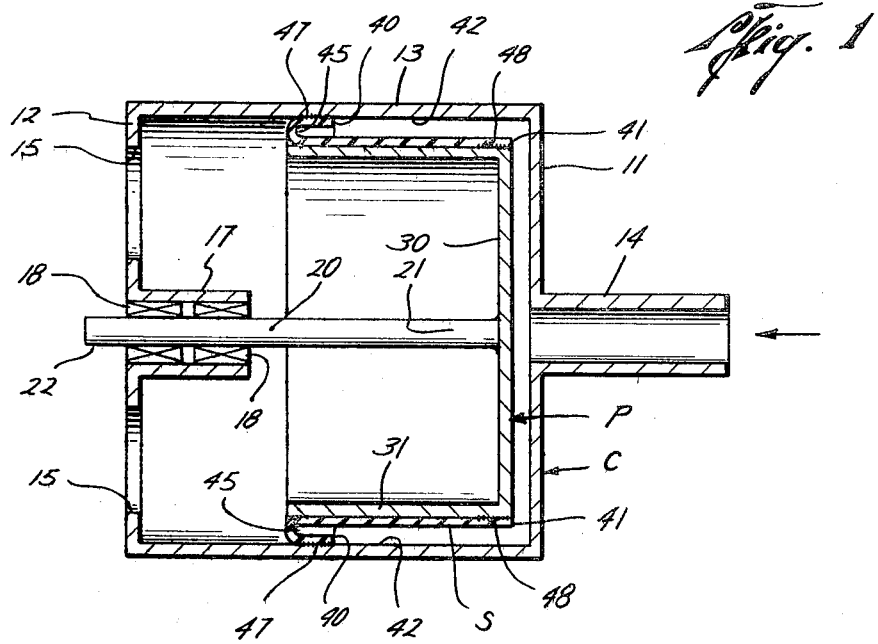
FIG. 1 is a cross sectional view of a spirometer having the U-shaped seal of the present invention and showing the movable piston in its at rest position.

Referring specifically to FIG. 1, there is shown a spirometer constructed in accordance with the present invention and including a container C generally cylindrical in configuration. The container C comprises a front end member 11 and a rear end member 12 which, respectively, are positioned at the ends of cylindrically shaped sidewall 13. An inlet means 14 is provided in the front end member 11 for introducing the exhaled breath into the interior of the container C. As shown, the inlet means 14 is a hollow projection and is adapted to receive a tubing or conduit, not shown, extending from the patient to the spirometer and through which the patient exhales.

The rear end 12 has an outlet means in the form of a plurality of openings 15 to allow free movement of the piston P within container C without entrapping fluid or thereby building up back pressure within the cylinder C.

The rear end member includes a centrally disposed bearing support means 17 projecting inwardly and which supports bearings 17. A rearwardly projecting shaft 20 is centrally affixed to the piston head 30 and is adapted to fit freely within the bearings 17. In operation, the bearings 17 support the shaft 20 and piston P for lateral movement thereof with a minimum of friction.

The rearward end 22 of the shaft 20 projects exterior of the container C and is connected to a suitable detection device for reading the desired functions. The detection device is not shown, however, it may comprise a transducer capable of detecting both the linear displacement of the moving shaft 20 as well as the rate of such movement. In this manner, both the patient's tidal volume and rate of exhalation can be detected and transmitted to a conventional read-out device, also not shown.

A piston skirt 31 is shown extending rearwardly from the piston head 30 and preferably is dimensioned to provide support for the rolling seal s, as will be explained.

As shown in FIG. 4, the U-shaped rolling seal S is constructed from a flat sheet of relatively thin silastic rubber sheeting by cutting a strip S' in a predetermined pattern. The flat rubber sheeting is without any fibers or reinforcing material since any such additional material introduces undesirable friction or hysteresis to the spirometer during movement of the seal S. In addition, the overall thickness is substantially the same throughout the area of the rubber sheeting and, therefore, the finished seal is free of bulges or thicker portions typical of molded seal material and thus is free from friction or hysteresis created by such dimensional irregularities.

The rubber sheet is preferably of medical grade rubber and is cut so as to form a truncated cone when the ends 34 and 35 of the strip are joined together in a butt joint 36 by a suitable bonding means, such as rubber cement. The use of a butt joint here minimizes the possibility of a thickened portion being formed in the overall seal S, such as would occur through the use of an overlapped joint, therefore, the friction losses as well as memory or hysteresis are minimized. For these reasons, the rolled seal S is kept free from thickened portions even around the perimeter of the ends 40 and 41.

The dimensions of the strip S' are such that the strip may be formed into a truncated cone having predetermined dimensions. As shown in FIG. 3, a band is formed having a larger diameter end 40 corresponding in size to the inner diameter of the cylinder C and a smaller diameter end 41 corresponding in size to the diameter of the skirt 31 of piston P.

Figure 2:
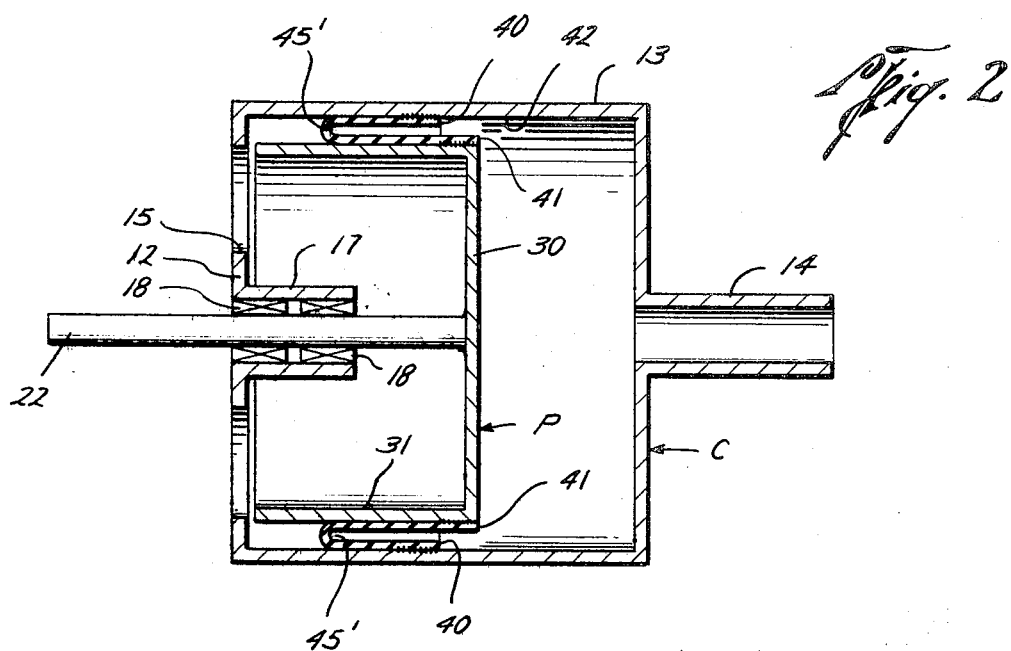
FIG. 2 is a cross sectional view of the spirometer having its piston removed from the at rest position of FIG. 1.

In constructing the seal S within the spirometer, a circumferential portion 47 on the inside of the band adjacent the greater diameter end 40 is secured, by glue or cement, to the inner surface 42 of the cylindrical wall 13. Similarly, a circumferential portion 48 on the inner surface of the band adjacent the smaller diameter end 41 is secured, by glue or cement, to the piston skirt 31 adjacent the forward edge of the piston head 30. Thus, as shown in FIG. 1, the piston P and the cylinder C are sealed by the U-shaped rolling seal with the fold, or valley 45 of the seal S being disposed adjacent the rear end of the piston when the piston P is in the forward position relative to the cylinder C. In FIG. 2, the piston is shown in the rearward position with respect to the cylinder C, thus the fold or valley 45 of the seal S has been displaced longitudinally along the seal to the position indicated as 45'.

Thus it will be seen that the spirometer of the present invention includes a rolling U-shaped seal formed by the inner side of one end of the seal secured to the inner wall of the cylinder and the inner side of the other end of the seal secured to the outer surface of the piston skirt, thereby providing a seal having the friction of only the rolling of a single fold and which will not stretch or blow-out in response to normal differential pressures.

In the preferred embodiment, the seal S is composed of medical grade silastic rubber having a hardness of 35–45 durometer. The preferred clearance between the piston P and the inner sidewall surface 42 is ten times greater than the thickness of the rubber seal from which the seal is formed. The aforementioned ratio is significant in that too large a ratio, i.e. 15 to 1, will allow small differentials in pressure, such as a slight negative pressure in the inlet means 14 may cause the seal to bunch up or even blowout, or reverse itself from its normal position, thereby causing wear in the seal and, if uncorrected, will cause a further lung measurement to be highly inaccurate. A clearance to seal thickness of considerably lower than the preferred ratio of 10 to 1, such as 7 to 1, creates higher friction losses during movement of the seal and, therefore, introduces inaccuracy into the measurement.

The blow-out problem is typically experienced in the S-shaped seal, previously discussed, which blows back in either direction easily, even at normal operating differential pressures. As shown in FIG. 1, the blow-out difficulty is further eliminated by sizing the seal of proper dimensions and by a careful positioning of the areas where the seal is bonded to the piston and cylinder. In the initial at rest position of FIG. 1, the circumferential portion 47 is secured to the inner surface 42 such that the valley 45 commences immediately adjacent the secured surfaces and thus, there is not sufficient excess material of the valley 45 to blowout upon experiencing a negative pressure from the inlet means 14.

In the extended or furthest forward position of the piston, as shown, in FIG. 2, the natural position of the valley 45 prevents blow-out from additional positive pressure exerted upon the seal. The problem of blow-out is, therefore, virtually eliminated in both of the extreme positions of piston travel in the present invention.

As a typical dimensional example of a spirometer utilizing the present seal, a piston having a diameter of about 11 to 12 inches, a seal having a thickness of about 0.020 inch, plus or minus 0.002 inch, is used and the annular clearance between the piston P and the cylinder wall 42 is preferably 0.2 inch, plus or minus 0.020 inch. The close thickness tolerance of 0.002 inch in the rubber seal minimizes the influence of a memory in the seal, typically found in higher pressure application molded seals. Also, the absence of reinforcing fibers or any other extraneous material is essential in minimizing the friction losses and facilitating accurate measurements.

I claim:

1. A spirometer for receiving and measuring the exhaled breath of a human, said spirometer comprising a cylinder having a front closure, a rear closure and an internal cylindrical surface, a piston mounted within said cylinder intermediate said front and rear closures, said piston having a shaft extending axially through said rear closure, bearing means centrally disposed in said rear closure adapted to receive said shaft whereby said piston is supported within said cylinder for substantially unrestrained axial movement therein, inlet means in said front closure adapted to admit the exhalation breath to the cylinder to exert a force against said piston, venting means in said rear closure adapted to vent said cylinder to atmosphere whereby said piston is caused to be displaced toward said rear closure, calibration means associated with said piston shaft to measure the axial displacement of said piston, seal means positioned between said piston and said internal cylindrical surface, said seal means having been constructed from a frusto-conical cone of uniformly thin, homogeneous silicone rubber sheet stock, said seal having the interior edge surface of the smaller end sealed to said piston and having the interior edge surface of the larger end sealed to said internal cylindrical surface, said seal further defining a U-shaped configuration having the concavity thereof facing said front closure of said cylinder whereby said seal is adapted to roll during the displacement of said piston and thereby create negligible friction to the displacing of said piston.

2. A spirometer comprising a cylinder having an internal cylindrical surface, a cylindrically shaped piston mounted in the cylinder for substantially free and unrestrained axial movement in the cylinder, means for admitting air pressure such as would be generated by human breathing into one end of said cylinder to exert a force on one side of the substantially unrestrained piston, means venting the other side of the substantially unrestrained piston to the atmosphere whereby a differential pressure across said piston may be readily created upon the admission of air pressure created by human breathing into the said one end of said cylinder, means connected to the piston and extending from said other side to give an external indication of the displacement of the piston, means mounting said piston for substantially free and unrestrained axial movement in said cylinder comprising bearing means supporting the piston in a central disposition with regard to said cylinder, said bearing means disposed on the said other side of said piston and arranged to support the movement of the piston in a substantially horizontal plane whereby the movement of the piston will be substantially unaffected by gravity forces, said mounting means further including a rolling seal positioned between said piston and said cylinder, said rolling seal having been constructed from a frusto-conical cone of uniformly thin homogeneous silicone rubber sheet stock, said seal having the interior edge surface of the smaller end hermetically joined to the piston and having the former interior edge surface of the larger end hermetically joined to the cylinder at a location closely adjacent the piston surface, said seal further defining a fold having a concavity facing the said one end of the cylinder which accommodates said differential pressure but permits substantially free axial movement of said piston in response to said differential pressure.

* * * * *